United States Patent [19]

Reilley

[11] Patent Number: 4,635,676
[45] Date of Patent: Jan. 13, 1987

[54] PROTECTIVE PROPANE TANK CONTROL HOUSING ASSEMBLY

[76] Inventor: Edmund W. Reilley, P.O. Box 1538, Kelowna, British Columbia, Canada, V1Y 7V8

[21] Appl. No.: 803,250

[22] Filed: Dec. 2, 1985

[51] Int. Cl.⁴ .................................... B65D 25/00
[52] U.S. Cl. .................... 137/354; 137/382; 220/85 P
[58] Field of Search ............. 220/85 P; 137/354, 381, 137/382

[56] References Cited

U.S. PATENT DOCUMENTS

| | | | |
|---|---|---|---|
| 1,690,461 | 11/1928 | Sieben | 137/382 |
| 2,781,944 | 2/1957 | Chute | 220/85 P |
| 3,963,144 | 6/1976 | Berwald | 220/85 P |
| 4,030,628 | 6/1977 | Hippert, Jr. | 220/85 P |

*Primary Examiner*—A. Michael Chambers

[57] ABSTRACT

A protective propane tank valve housing assembly for motor vehicle propane fuel tanks, has an elongated propane fuel tank with a set of controls disposed on the tank and spaced apart in a direction lengthwise thereon. A casing has side and end panels, which define a side opening of the casing. A casing cover is pivotally connected at a first end panel, and swingable between a closed position in which the casing cover lies adjacent, and covers, the side opening of the casing, and an open position outwardly pivoted from the closed position. The casing cover further has a first flange extending from a second end of it. A second flange extends from the second end panel of the casing, and mates with first flange when the casing cover is closed. Such an arrangement allows a lock to extend between the first and second flanges, to lock the casing cover in the closed position. In a typical installation, the casing is already provided on the fuel tank, and the casing cover and the second flange, are mounted on brackets which are connected to the casing.

13 Claims, 8 Drawing Figures

PROTECTIVE PROPANE TANK CONTROL HOUSING ASSEMBLY

FIELD OF THE INVENTION

This invention relates to a protective propane tank control housing arrangement, to restrict unauthorized persons such as vandals, from having access to controls on a motor vehicle propane fuel tank, and for reducing the risk of damage to such controls as a result of road hazards (for example rocks thrown up by the wheels of a moving vehicle).

DESCRIPTION OF PRIOR ART

Propane as a motor vehicle fuel has become increasingly popular. In order to allow a motor vehicle to be run from propane, typically an elongated propane fuel tank is fitted on the vehicle, often adjacent and under the rear bumper of the vehicle, or at other locations (such as under a side of the vehicle). Such fuel tanks have a set of "controls", spaced apart in a direction on it, which set of controls consists typically of a filling opening, to permit filling of the propane tank, a control valve, a pressure regulator, the fuel outlet line connection to the tank from the engine, as well as perhaps other controls. Often such tanks were provided with a partial casing for the control set, which partial casing included a lower panel, and two end panels. The difficulty with such prior arrangements though, is that the controls were open to access by unauthorized individuals. In particular, vandals might tamper with the controls, producing at best an inconvenient situation, and at worse a potentially dangerous one. The partial casing provided on the tanks previously, did nothing to prevent such tampering, nor to minimize exposure of the controls to damage, such as by rocks thrown up by the wheels of the vehicle, or by other road hazards.

A number of means for locking gas or other valves in the desired position have been provided in the past. For example, such are disclosed in U.S. Pat. Nos. 3,156,256 to Weaver; 4,208,893 to Arvich; 674,582 to Lewy; 961,959 to Herfurth; 1,530,814 to Credle; 1,947,081 to Grady; 1,690,461 to Sieben; 4,352,370 to Childress; 4,380,247 to Douglas; and 4,478,345 to Edinger. None of the foregoing devices though, disclose arrangements whereby access to a control set on a propane fuel tank, is prevented, in order to inhibit tampering by vandals or other unauthorized persons.

It would be desireable then, on motor vehicles equipped with propane fuel tanks, in particular propane tanks, to prevent unauthorized access to the controls thereon, and in particular inhibit tampering of the foregoing controls by vandals or other unauthorized individuals, and which arrangement is relatively economical to construct.

SUMMARY OF THE INVENTION

The present invention provides a protective propane tank control housing assembly. The assembly has an elongated propane fuel tank which has a set of controls disposed on the tank and spaced apart in a direction lengthwise of the tank. A casing has an outwardly projecting elongated lower side panel, which extends along the tank adjacent the set of controls on it. The casing further has first and second outwardly projecting opposed end panels. These end panels extend laterally on the tank from respective ends of the side panel. The side panel and end panels have coplanar outer side edges which define a side opening of the casing. A casing cover is pivotally connected at a first end to the first end panel. This arrangement is such as to allow the casing cover to be swingable between a closed position, in which the casing cover lies adjacent, and covers the side opening of the casing, and an open position outwardly pivoted from the closed position. The casing cover is further provided with a first flange extending from a second end of it. A second flange extends from the second end panel of the casing. This second flange is arranged to mate with the first flange, when the casing cover is closed. Furthermore, such arrangement allows a lock to extend between the first and second flanges, to lock the casing cover in the closed position.

Preferably, the side panel of the casing, and the casing cover, are substantially rectangular in shape. Furthermore, the first and second flanges preferably extend in a lengthwise direction of the tank. Each of the foregoing flanges, usefully has an opening therethrough which mates with the opening of the other, when the casing cover is in the closed position.

The casing cover, further preferably has an inwardly extending side flange along a side edge of it. This arrangement is such as to substantially close an open side of the casing, often present on the casing, when the casing cover is in the closed position.

DRAWINGS

Embodiments of the invention will now be described in detail, with reference to the drawings in which.

DETAILED DESCRIPTION OF EMBODIMENTS OF THE INVENTION

Figure 1:
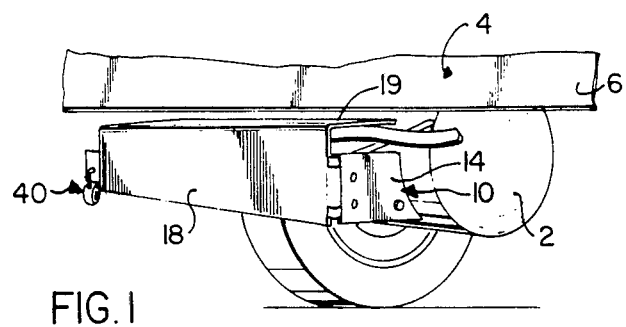
FIG. 1 is a perspective view of an assembly of the present invention.
Figure 2:
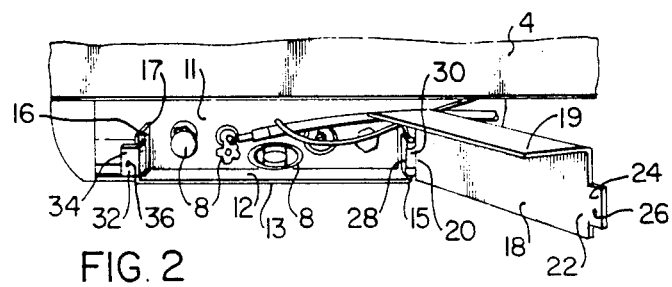
FIG. 2 is a view the similar to FIG. 1, but showing the casing cover in an open position.
Figure 3:
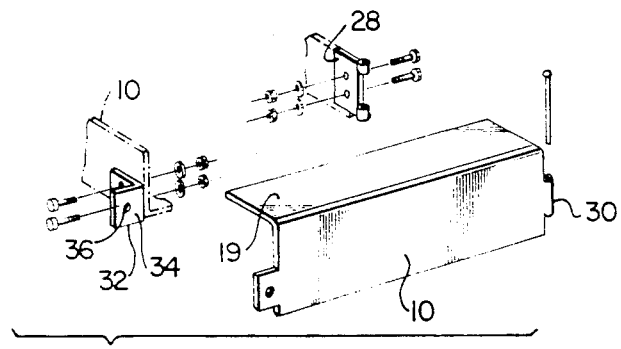
FIG. 3 is an exploded view of most of the assembly of FIGS. 1 and 2.

Referring first to FIGS. 1-3, the assembly shown consists of an elongated propane fuel tank 2, typically a propane tank, which is disposed beneath a bumper 6 on the rear end of a motor vehicle, in particular truck 4. A set of controls 8 is provided on tank 2, which set consists of a filling nozzle, control valve, and outlet line to the vehicle engine, as well as perhaps other controls. The controls of the set are spaced apart in a direction lengthwise on tank 2, as best shown in FIG. 1. A casing 10 has an outwardly projecting elongated lower side panel 12, having an outer side edge 13. Panel 12 extends along tank 2 adjacent the set of controls 8 thereon in the manner again best shown in FIG. 1. Casing 10 further includes first and second outwardly projecting opposed end panels 14, 16 respectively. End panels 14, 16 extend laterally on the tank from respective ends of side panel 12, in the manner again best shown in FIG. 1. End panels 14, 16 have respective outer side edges 15, 17, which are coplanar with outer side edge 13 of side panel 12. The foregoing coplanar side edges, define a side opening of casing 10. It will be noted that casing 10 has an open side opening 11, which is an upper side opening, defined by upper edges of end panels 14, 16. In the installation of tank 2 shown in FIGS. 1-3 though, such open side opening 11 is not readily accessible, since it is effectively covered or closed by bumper 6.

A casing cover 18, with a first end 20 and second end 22, is pivotally mounted by means of hinge 30 at its first end 20, to a bracket 28. Bracket 28 is in turn connected to casing 10 by means of bolts or the like, such bolts preferably having flat heads. Casing cover 18 carries at outer end 22, a first flange 24, with an opening 26 therein. Casing cover 18 is shown in an open position in FIG. 1, and is pivotable between the open position of FIG. 1, and a closed position as shown in FIG. 2, in which casing cover 18 lies adjacent, and covers the side opening of casing 10. When casing cover 18 is in the closed position shown in FIG. 2, it will be appreciated that first flange 24 extends in a lengthwise direction of tank 2.

A second bracket 32 is connected to second end panel 16 of casing 10, again by means of bolts or the like. Second bracket 32 has a second flange 34, which extends in the lengthwise direction of tank 2, as shown in FIGS. 1-3. Second flange 34 has an opening 36 therein, which is positioned to mate with opening 26 in first flange 24 of casing cover 18. Thus, when casing cover 18 is in the closed position as shown in FIG. 2, a lock 40 can extend between flanges 24 and 34, by having its shaft engaged through openings 26 and 36. By such means, casing cover 18 may be secured or locked in the closed position, to prevent unauthorized access to controls 8, and in particular to prevent vandals or other persons from gaining such access, with potentially dangerous consequences. Furthermore, when casing cover 18 is in the closed position, the exposure of the controls to various road hazards (such as to rocks thrown up by the wheels of a moving vehicle), is minimized. Again, such exposure could have potentially dangerous consequences, particularly should any of the controls be ruptured or caused to malfunction.

The assembly described, is primarily constructed from metal, although use of other materials may be possible, as will be apparent to those skilled in the art. In a typical installation, casing cover 10 is already disposed on tank 2, and one simply provides openings on end panels 14 and 16, by means of drilling or the like, by which first and second brackets, 28, 32 can be connected by means of bolts to respective end panels 14, 16. Casing cover 18 can then be pivoted to the open position shown in FIG. 1, for access to controls 8, or pivoted to the closed position and locked therein if desired, as shown in FIG. 2.

In the embodiment of the invention shown in FIGS. 1-3, casing cover 18 also optionally has an inwardly extending side flange 19, in particular an upper side flange, along its upper side edge. Upper flange 19 is dimensioned and disposed to substantially close open side 11 of casing 10, when casing cover 18 is in the closed position. Upper flange 19 is required when tank 2 is disposed such that side 11 is not covered by a portion of the vehicle, such as bumper 6, as shown in the installation of FIGS. 1-3. For example, side flange 11 will likely be required if tank 2 is disposed underneath the side of the vehicle or elsewhere on the vehicle. If open upper end 11 of casing 10, is effectively covered by bumper 6 though, flange 19 can be omitted.

Figure 4:
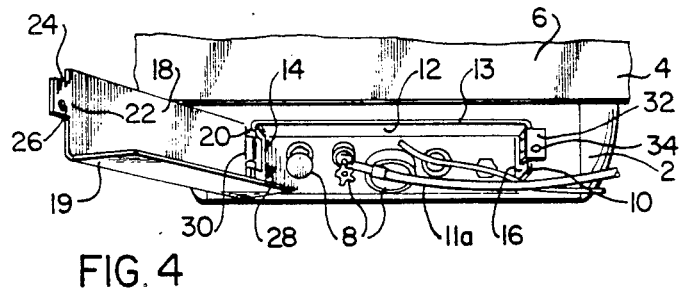
FIG. 4 is a view similar to FIG. 3 but showing an alternate assembly.

In an alternate assembly as shown in FIG. 4, casing 10 has an open lower side 11a. In such an assembly, casing cover 18 is simply inverted during installation, from the position shown in FIGS. 1-3, so that side flange 19 acts as a lower side flange. Thus, flange 19 in such embodiment can cover lower side 11a, when cover 18 is in the closed position.

Figure 5:
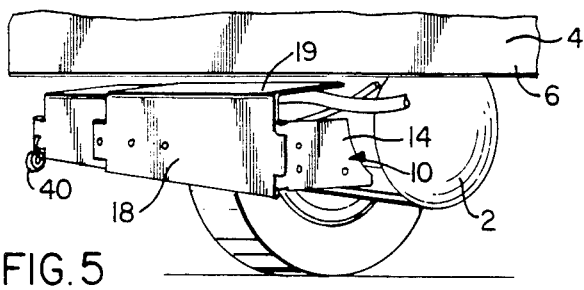
FIG. 5 is a perspective view of a further alternate assemply of the present invention.
Figure 6:
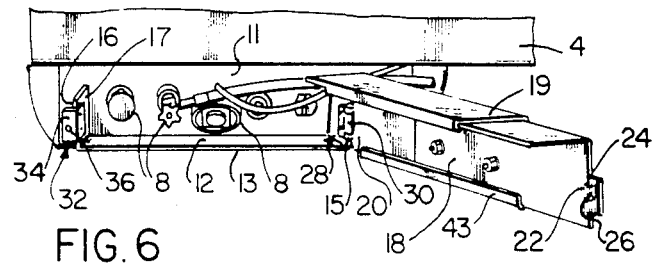
FIG. 6 is a view similar to FIG. 5, but showing the casing cover in an open position.
Figure 7:
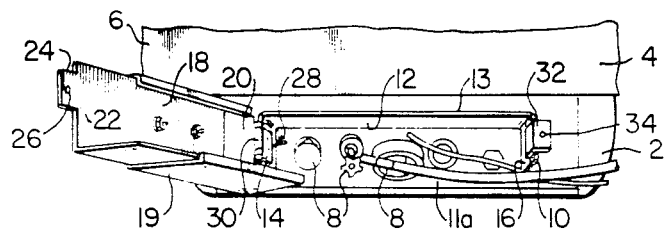
FIG. 7 is perspective view of the modification of the embodiment of FIGS. 5 and 6.
Figure 8:
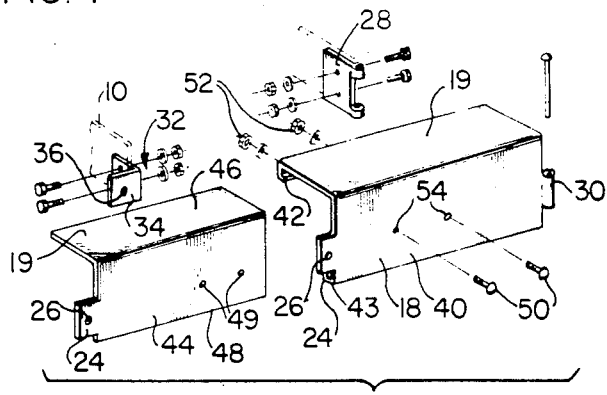
FIG. 8 is an exploded view of most of the assembly of FIGS. 5 and 6.

Referring now to FIGS. 5, 6, and 8, the assembly shown in those Figures is essentially the same as that shown in FIGS. 1-3. However, in the assembly of the former Figures, the casing cover 18 consists of two sections 40, 44. A downcurved lip 42 extends from that portion of upper flange 19 disposed on first section 40. Likewise, an upcurving lip 43 is provided on a lower side of the cover 18. Lips 42, 43 are dimensioned and spaced, to slidably receive edge portions 46, 48, respectively of second section 44. By this arrangement then, casing cover 18, is telescopically extendable between a plurality of positions. Bolts 50 and nuts 52, in conjuction with openings 49, 54, act as retaining means for retaining cover 18 in any of a plurality of telescoped positions. In addition, section 40 is provided with a flange 24, as is section 44. Thus, it will be seen that cover 18 of the embodiment of FIGS. 5, 6, and 8 has four possible "telescoped" positions. One is with section 44 removed completely from section 40 (in which case of course, bolts 50 and nuts 52, would not be required). In addition, there will be three positions to which section 44 can be telescoped within section 40, and be retained in any of such positions, by one or both of bolts 50 and associated nuts 52.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

I claim:

1. A protective motor vehicle propane tank housing assembly, comprising:
   (a) an elongated propane fuel tank having a set of controls disposed on the tank and spaced apart in a direction lengthwise thereon;
   (b) a casing with an outwardly projecting elongated lower side panel, extending along the tank adjacent the set of controls thereon, and with first and second outwardly projecting opposed end panels, extending laterally on said tank from respective ends of the side panel, the side panel and end panels having coplanar outer side edges defining a side opening of said casing;
   (c) a casing cover pivotally connected at a first end to the first end panel, so as to be swingable between a closed position in which said casing cover lies adjacent, and covers, the side opening of said casing, and an open position outwardly pivoted from the closed position, the casing cover having a first flange extending from a second end thereof, and
   (d) a second flange extending from the second end panel of said casing, so as to mate with the first flange when said casing cover is closed, and allow a lock to extend between the first and second flanges to lock said casing cover in the closed position.

2. A protective motor vehicle propane tank housing assembly as described in claim 1, wherein the side panel of said casing, and said casing cover, are substantially rectangular, and wherein the first and second flanges extend in a lengthwise direction of the tank, and each one has an opening therethrough which mates with the opening of the other when said casing cover is in the closed position, so as to receive a padlock through the mating openings.

3. A protective motor vehicle propane tank housing assembly for use with:
   (i) an elongated propane fuel tank having a set of controls disposed on the tank and spaced apart in a direction lengthwise thereon;
   (ii) a casing with an outwardly projecting elongated lower side panel, extending along the tank adjacent the set of controls thereon, and with first and second outwardly projecting opposed end panels, extending laterally on said tank from respective ends of the side panel, the side panel and end panels having coplanar outer side edges defining a side opening of said casing
   the housing assembly comprising:
   (a) a first bracket adapted to be fixedly mounted on the first end panel;
   (b) a second bracket adapted to be fixedly mounted on the second end panel; and having a second flange extending therefrom;
   (c) a casing cover having a first flange extending from a second end thereof, and pivotally connected at a first end to the first end panel, so that when said first and second brackets are connected to the first and second end panels, respectivley, of the housing, said casing cover is swingable between a closed position in which said casing cover lies adjacent, and covers, the side opening of the casing, with first flange mating with the second flange to allow a lock to extend therebetween, and an open position outwardly pivoted from the closed position.

4. A protective motor vehicle propane tank housing assembly as described in claim 3, wherein said casing cover is substantially rectangular, and wherein the first and second flanges extend in a lengthwise direction of the tank and have respective mating openings therethrough which can mate with one another, when said first and second brackets are connected to the first and second end panels, respectively, of the housing, and said casing cover is in the closed position.

5. A protective motor vehicle propane tank housing assembly as described in claim 1, wherein said casing cover has an inwardly extending side flange along a side edge thereof, to substantially close an open side of the casing, when said casing cover is in the closed position.

6. A protective motor vehicle propane tank housing assembly as described in claim 3, wherein said casing cover has an inwardly extending side flange along an side edge thereof, to substantially close an open side of the casing, when said casing cover is in the closed position.

7. A protective motor vehicle propane tank housing assembly as described in claim 4, wherein said casing cover has an inwardly extending side flange along a side edge thereof, to substantially close an open side of the casing, when said casing cover is in the closed position.

8. A protective propane tank control housing as described in claim 1, wherein said casing cover is telescopically extendable between a plurality of telescoped positions in the lengthwise direction of the tank, so that said cover can cover side openings of various lengths on each of a plurality of casings.

9. A protective propane tank control housing as described in claim 3, wherein said casing cover is telescopically extendable between a plurality of telescoped positions in the lengthwise direction of the tank, so that said cover can cover side openings of various lengths on each of a plurality of casings.

10. A protective propane tank control housing as described in claim 5, wherein said casing cover is telescopically extendable between a plurality of telescoped positions in the lengthwise direction of the tank, so that said cover can cover side openings of various lengths on each of a plurality of casings.

11. A protective propane tank control housing as described in claim 7, wherein said casing cover is telescopically extendable between a plurality of telescoped positions in the lengthwise direction of the tank, so that said cover can cover side openings of various lengths on each of a plurality of casings.

12. A protective propane tank control housing as described in claim 8, additionally comprising retaining means for retaining said cover in any of a plurality of the telescoped positions.

13. A protective propane tank control housing as described in claim 11, additionally comprising retaining means for retaining said cover in any of a plurality of the telescoped positions.

* * * * *